United States Patent
Grondahl

(10) Patent No.: US 6,591,728 B1
(45) Date of Patent: Jul. 15, 2003

(54) CLAMPING POWER TOOL GUIDE WITH INTEGRAL MEASUREMENT TOOL

(76) Inventor: David G. Grondahl, 1861 Craig Drive, Nanoose Bay, British Columbia (CA), V9P 9C8

( * ) Notice: Subject to any disclaimer, the term of this patent is extended or adjusted under 35 U.S.C. 154(b) by 0 days.

(21) Appl. No.: 09/478,201

(22) Filed: Jan. 5, 2000

(51) Int. Cl.[7] ................................................ B27B 5/00
(52) U.S. Cl. .................. 83/743; 83/745; 83/522.25; 83/440; 30/371
(58) Field of Search .............. 83/745, 574, 522.19, 83/522.25, 743, 440; 33/403, 454, 474, 476, 645, 479, 443; 30/371; 144/144.1, 307; 269/273, 87.1, 307, 83, 33, 30, 144

(56) References Cited

U.S. PATENT DOCUMENTS

| | | | | |
|---|---|---|---|---|
| 2,208,412 A | * | 7/1940 | Doniger | 269/307 |
| 2,277,634 A | * | 3/1942 | Dalager | 33/403 |
| 2,641,149 A | | 6/1953 | Petersen | |
| 2,655,956 A | | 10/1953 | Taylor | |
| 2,956,598 A | | 10/1960 | Johnson | |
| 3,284,895 A | | 11/1966 | Selander et al. | |
| 3,287,808 A | | 11/1966 | Fortune | |
| 3,829,231 A | | 8/1974 | Hamilton | |
| 3,939,915 A | * | 2/1976 | Wood | 269/2 |
| 4,031,794 A | * | 6/1977 | Leihgeber | 83/829 |
| 4,292,870 A | * | 10/1981 | Mericle | 83/471.2 |
| 4,378,716 A | * | 4/1983 | Volk | 83/438 |
| 4,476,759 A | * | 10/1984 | Aderneck | 83/574 |
| 4,494,434 A | | 1/1985 | Young | |
| 4,522,098 A | | 6/1985 | Bliss | |
| 4,811,643 A | * | 3/1989 | Krieger | 83/745 |
| 4,939,968 A | * | 7/1990 | Stoof | 83/886 |
| 5,148,730 A | * | 9/1992 | McCaw | 83/745 |
| 5,182,975 A | * | 2/1993 | Warner | 83/745 |
| 5,333,385 A | * | 8/1994 | Chou | 30/371 |
| 5,353,515 A | * | 10/1994 | Alvis et al. | 33/640 |
| 5,385,183 A | | 1/1995 | Ferranti | |
| 5,390,425 A | * | 2/1995 | Gilberts | 33/764 |
| 5,408,909 A | * | 4/1995 | Suk | 83/614 |
| 5,509,338 A | | 4/1996 | Ekker | |
| 5,533,556 A | * | 7/1996 | Whitney | 33/403 |
| 5,687,628 A | * | 11/1997 | Liao | 83/745 |
| 5,964,041 A | * | 10/1999 | Daniel | 33/403 |
| 5,979,063 A | * | 11/1999 | Pritz | 30/293 |
| 6,062,122 A | * | 5/2000 | Niemczyk | 83/745 |
| 6,195,905 B1 | * | 3/2001 | Cole | 83/477.2 |

FOREIGN PATENT DOCUMENTS

| | | |
|---|---|---|
| CA | 1318834 | 6/1993 |
| EP | 062379 | 10/1982 |

* cited by examiner

Primary Examiner—Kenneth E. Peterson
Assistant Examiner—Omar Flores Sánchez
(74) Attorney, Agent, or Firm—Oyen Wiggs Green & Mutala

(57) ABSTRACT

Prior power tool guides have not been successful as they have been awkward and inconvenient for a busy tradesperson to position on the workpiece. Those tool guides which have an integral gauge for measuring the required spacing between the guide and the tool cut in some cases may be readily used only for short cuts on narrow workpieces or must be held on the workpiece by hand. The present invention provides a saw guide which has an integral measuring gauge for locating the guide and an integral clamp which permits the guide to be quickly positioned and clamped on both narrow and wide workpieces.

12 Claims, 3 Drawing Sheets

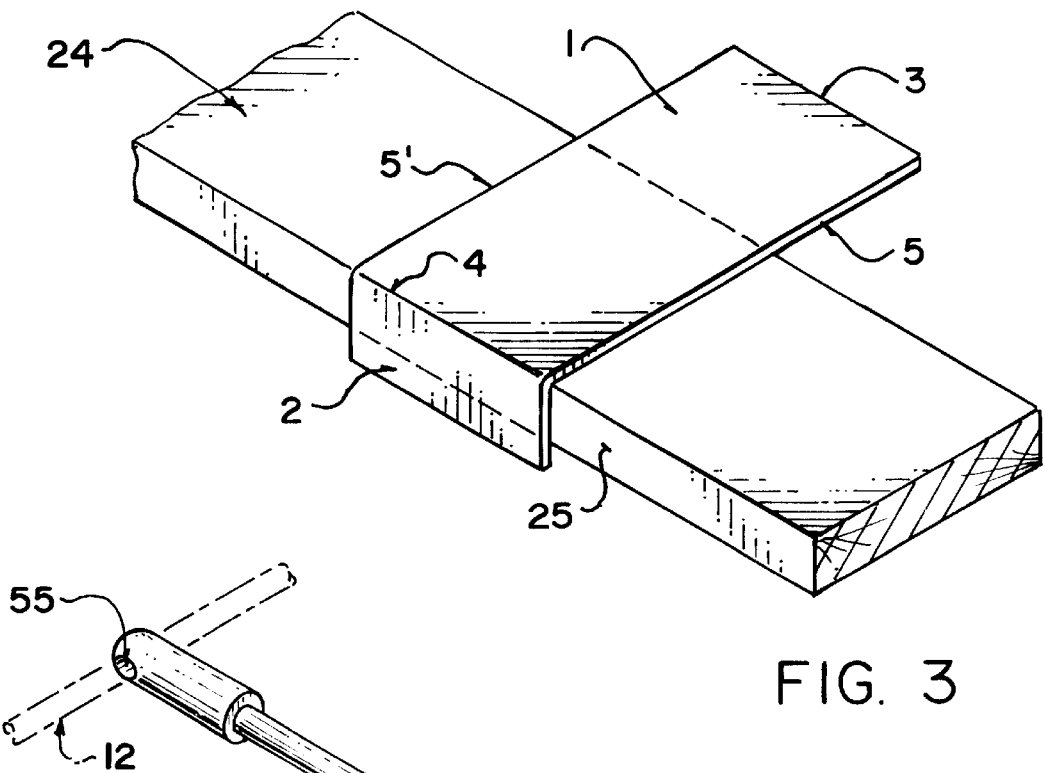
FIG. 3
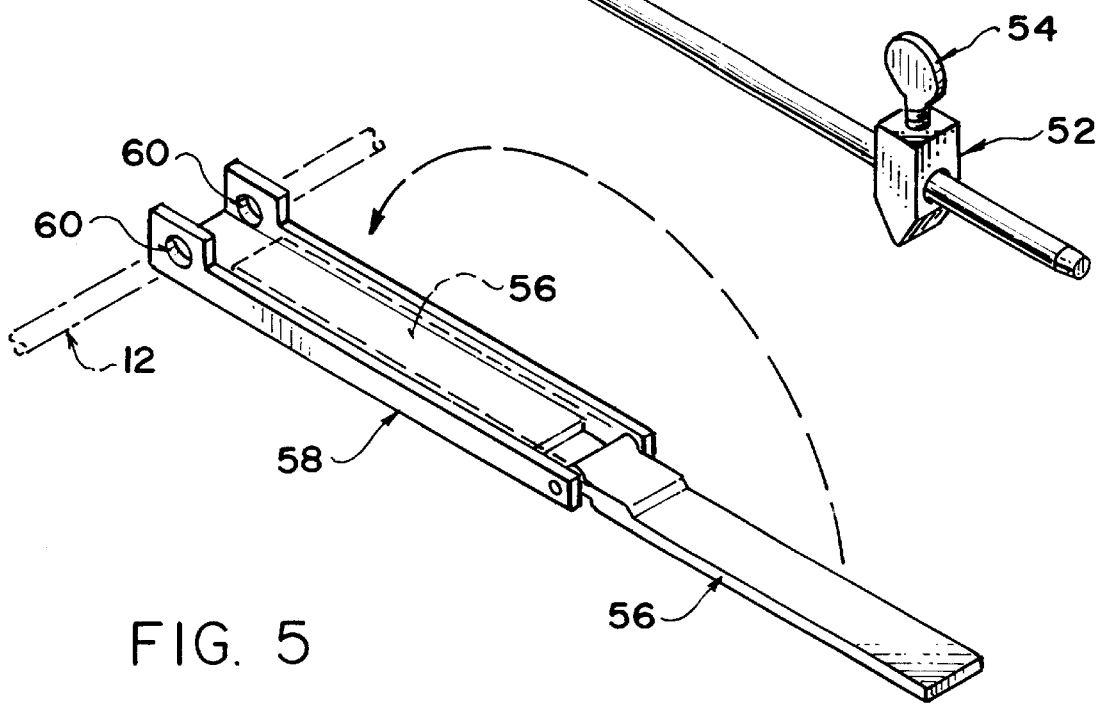
FIG. 4
FIG. 5

CLAMPING POWER TOOL GUIDE WITH
INTEGRAL MEASUREMENT TOOL

TECHNICAL FIELD

The invention relates to the field of guides for power cutting tools, and more particularly to a clamping guide for hand power tools which has integral measuring means.

BACKGROUND ART

When cutting a work-piece using a power cutting tool such as a power hand saw, the carpenter typically measures a pencil line on the work-piece and guides the saw along the line by the unaided eye. To ensure that such saw cuts are straight and accurate, various guides have been developed which are secured to the work piece. For example, U.S. Pat. No. 3,287,808 Fortune issued Nov. 29, 1966 discloses a saw guide which is clamped to the workpiece and has an edge against which the saw is guided. An elongated secondary guide swings over the guide into operative position to permit a scribe which slides along the secondary guide to mark a reference line. Similarly, U.S. Pat. No. 4,522,098 Bliss, issued Jun. 11, 1985 discloses a saw guide which is clamped to the workpiece and has a rib against which the saw is guided. Similarly, U.S. Pat. No. 5,385,183 Ferranti issued Jan. 31, 1995 discloses a saw guide which grips the workpiece and has an edge against which the saw is guided. None of these guides has apparently achieved commercial success as they are awkward and inconvenient for a busy tradesperson to position on the workpiece. U.S. Pat. No. 4,494,434 Young, issued Jan. 22, 1985 discloses a saw guide which has an integral gauge for measuring the required spacing between the guide and the saw cut, but without an expansion piece, it is only suitable for short cuts on narrow workpieces and is held on the workpiece by hand.

There is therefore a need for an improved power tool guide which has an integral measuring gauge for locating the guide and an integral clamp which permits the guide to be quickly positioned and clamped on both narrow and wide workpieces.

DISCLOSURE OF INVENTION

The present invention therefore provides a power tool guide adapted for releasably securing to a workpiece having upper and lower planar surfaces, the power tool guide comprising i) a first planar plate having a planar upper surface, a planar lower surface and a first straight guide edge perpendicular to the first planar upper surface; ii) a second planar plate extending perpendicularly to the first planar surface and to the straight guide edge, the second planar plate having a planar inner surface and a planar outer surface; and iii) clamping means secured to the planar outer surface of the second planar plate, the clamping means having an adjustable lower clamping jaw adapted to bear against the lower surface of the workpiece and thereby releasably secure the guide to a workpiece. According to one aspect of the invention the power tool guide further comprises iv) a pivotable bar having a surface for receiving an off-set marking, movable along the length of the upper surface of the first planar plate in a direction parallel to the first straight guide edge, and adapted to pivot from a position extending perpendicularly to, and beyond the edge of the first straight guide edge to a position spaced from the first straight guide edge to permit the passage of the power tool.

BRIEF DESCRIPTION OF INVENTION

In drawings which illustrate a preferred embodiment of the invention:

FIG. 3 illustrates the surface plate and side plate of the invention on the workpiece;

FIG. 4 is a perspective view of a second embodiment of a measuring bar; and

FIG. 5 is a perspective view of a third embodiment of a measuring bar.

BEST MODE(S) FOR CARRYING OUT THE INVENTION

Figure 1:
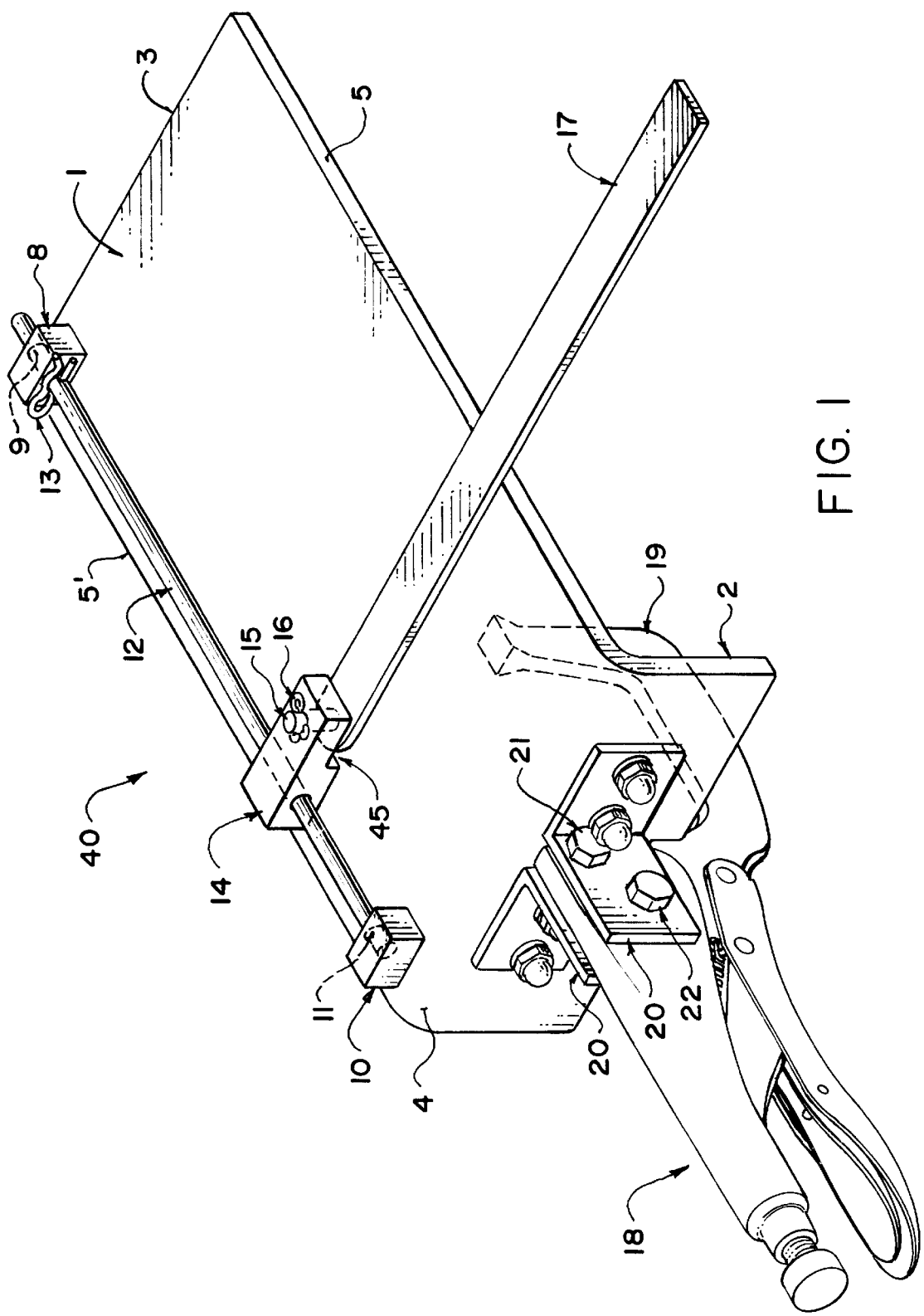
FIG. 1 is a perspective view of the invention.
Figure 2:
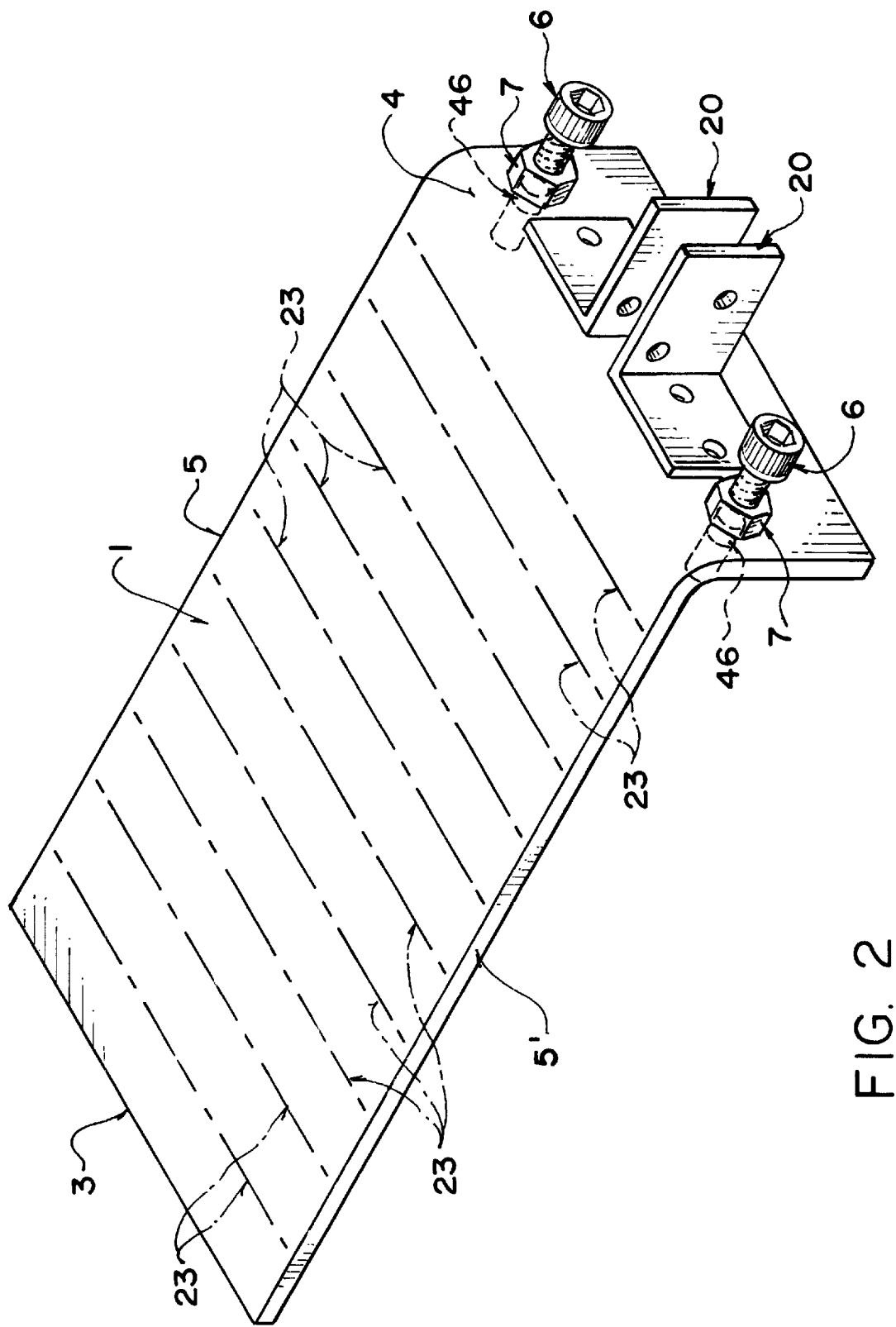
FIG. 2 is a perspective view of the invention with the clamp and gauge removed for ease of illustration.

With reference to the drawings, the power tool guide of the invention is generally indicated by reference numeral 40, for guiding the cut of a power tool such as a circular saw (not shown) on workpiece 24. It has a surface plate 1 and side plate 2, preferably of a metal such as aluminum, but which could also be other suitable material such as steel or plastic. Surface plate 1 is preferably smooth on the upper surface, but could also be textured or dimpled on its lower surface to reduce slipping. Surface plate 1 is of a thickness about ¼ inches and is preferably about 6 inches wide by 14 inches long to permit use on boards up to 11½ inches wide (2×12's). It has front edge 3, rear edge 4 and smooth parallel side guide edges 5. Surface plate 1 may be provided with reference lines 23 whose use will be described below. Side plate 2 is perpendicular to surface plate 1 extending downwardly about 2¼ inches. Adjustment bolts 6 may be provided which are screwed in threaded holes 46 ensure that the side plate maintains a square relationship to its own guide edge. The inner ends of bolts 6 may be flared to provide a wider contact surface with side 25 of workpiece 24. Locking nuts 7 permit the adjustment screws to be locked in place.

Side plate 2 is provided with mounting brackets 20 to which locking pliers 18 are secured by bolt/nut/lockwasher combinations 21, 22. Mounting brackets 20 may be welded or bolted to side plate 2 or formed integrally with side plate 2. Alternatively, the pliers could be secured to brackets 20 by adhesives, welding, moulding or the like, or formed integrally with side plates 2. Locking pliers 18 are preferably of the VISE GRIP™ "C" clamp type with the upper jaw removed and have lower "C" clamp jaw 19. See U.S. Pat. No. 2,641,149 issued Jun. 9, 1953 to Petersen Mfg. Co. Inc. The portion of clamp jaw 19 which contacts the workpiece may have an attached swivel plate to reduce damage to the workpiece. The locking pliers act both as a clamp to clamp the guide to the workpiece and as a handle to allow the tradesperson to manoeuvre and position the guide.

Surface 1 has attached to it a rod 12 along which slides a sliding block 14 to which measuring bar 17 is pivotally attached by hinge pin 15 and cotter pin 16. Block 14 may have a protruding grip or handle on its top surface to assist in moving it. A cut-out 45 is provided in the under surface of block 14 to receive measuring bar 17. Either end of rod 12 is fixed in mounting blocks 8, 10 which are glued or welded to surface 1, or bolted or integrally formed as part of surface 1. Rod 12 may be a ⅜ inch diameter aluminum rod which slides through a hole in block 14 with a slidable friction fit, and may be installed by sliding through a hole in block 8 and into a receptor partial hole or cavity in block 10, and then secured by pin 13.

In operation, the tradesperson marks on the measuring bar 17 the distance from guide edge 5 which corresponds to the distance between the saw blade and the guide edge on the power saw base or table (referred to as the "integral fence") on that tradesperson's power saw, referred to as the "offset distance". This is done by swinging the measuring bar to a position perpendicular to guide edge 5, such as by aligning it with one of the reference lines 23. A ruler is the placed against guide edge 5 and the offset distance from edge 5 is marked on measuring bar 17. This can be marked using a scribe or pencil.

The side plate 2 can be adjusted using optional adjustment bolts 6 prior to use to ensure that the guide edges 5, 5' are square to the workpiece's edge when the side plate 2 is pressed against the edges of that workpiece. This is done by finding a workpiece with a fairly straight edge and using a carpenter's square to draw a line square to the edges of the board. The tradesperson then place the invention on the board with edge 5 aligned near that line and the side plate 2 pressed firmly against the edges of the board. Lock nuts 7 are backed off and rotating screws/bolts 6 rotated clockwise or counter-clockwise until the edge 5 is parallel to the square line, at which point the lock nuts are secured.

To use the invention to saw a workpiece 24, the tradesperson measures and marks the "cutoff mark" at the desired length from the end of the workpiece using a tape measure. There is no need to employ a carpenter's square to mark a square path on the workpiece. The invention is placed on the board with side plate 2 pressed firmly against the edge 25 of the workpiece. Measuring bar 17 is then swung into perpendicular position in line with reference lines 23 and then slid along rod 12 until the offset mark on bar 17 is close to the cut-off mark. The invention is then moved along the length of the board until the offset mark is aligned with the cutoff mark. The locking plier 18 is then adjusted to the thickness of the work piece and clamped to the work piece. Measuring bar 17 is then swung out of the way and the power tool is run across the work piece with its integral fence against guide edge 5, making a square cut along the cutoff mark. As the measuring bar 17 can be slid across the surface of the guide, the cutoff mark can be made anywhere on the face of the workpiece.

The fact that surface plate 1 is relatively thin and is free of obstructions allows a near full depth of cut for the power saw, unlike other saw guides which have tall guide edges or obstructions which rise well above the surface of the workpiece. Such obstructions must be cleared by elevating the tool should any part of the tool overhang the tool's integral fence. Placement of the locking pliers 18 below the plane of the cutting surface similarly permits full depth of cut for the power tool. Sliding block 14 on rod 12 permits the guide in this invention to be readily aligned with the cut-off mark regardless of where on the workpiece the cutoff mark is located. Since the guide of the present invention is clamped to the workpiece, the tradesperson can operate the power tool without holding the guide, and can move to either side of the workpiece. Alternatively, the tradesperson can simply clamp the guide in place by squeezing the handle without locking it. Similarly the guide can be used on vertical as well as horizontal surfaces and in wet as well as dry conditions. Surface 1 also has a second guide edge 5' which can be used to guide a power tool in situations where edge 5 cannot be used, although it does not provide an offset measurement unless the block 14 and measuring bar 17 are reversed in orientation on rod 12, which can be done by removing rod 12 from the holes 9, 11 in blocks 8 and 10, and reversing block 14 before re-inserting rod 12 in the holes 9, 11 in blocks 8 and 10.

While measuring bar 17 has been illustrated as a flat metal bar, it may also be in the form of a rod 50 as shown in FIG. 4, with an adjustable slide 52 which may be released or secured by screw 54 to mark the offset distance. Rod 50 slides and pivots on rod 12 which extends through aperture 55, and is swung out of the way, over rod 12, to avoid contact with the saw. Alternatively, measuring bar 17 may be formed of two pivoting pieces 56, 58 as shown in FIG. 5 wherein piece 56 pivots on piece 58 and piece 58 slides along bar 12 through apertures 60. Piece 56, or both piece 56 and 58 can pivot vertically out of the way of the power saw about rod 12.

It will be seen, therefore, that the present invention provides a faster, safer and more accurate means of marking and guiding the power saw cut. The need for a carpenter's square to mark the cut-off line is avoided. The locking pliers act both as a clamp to clamp the guide to the workpiece and as a handle to allow the tradesperson to manoeuvre and position the guide. Further the measuring bar permits a number of off-set marks to be made on the guide so the guide can be used for a number of different tools without altering the configuration.

While the invention has been disclosed as providing a device for guiding a square cut, it is also useful for guiding a mitred saw cut where the power saw blade can be angled relative to the base of the power saw. Also while the application to a power hand circular saw has been disclosed, the invention is applicable to other power tools such as routers, jig saws and the like which have an off-set guide edge.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A power tool guide adapted for releasably securing to a workpiece having upper and lower planar surfaces and opposed edges perpendicular to and extending between said upper and lower planar surfaces, said power tool guide comprising:

i) a first planar plate having a planar upper surface, a planar lower surface and a first straight guide edge perpendicular to said first planar upper surface;

ii) a second planar plate connected to said first planar plate and extending perpendicularly to said first planar plate and to said straight guide edge, said second planar plate having a planar inner surface and an outer surface; and iii) clamping means secured to said outer surface of said second planar plate, said clamping means having an adjustable lower clamping jaw adapted to bear against said lower surface of said workpiece when said planar lower surface of said first planar plate is in contact with said upper planar surface of said workpiece and said planar inner surface of said second planar plate is in contact with one of said opposed edges of said workpiece and thereby releasably secure said guide to a workpiece; and iv) a pivotable bar having a surface for receiving an off-set marking, movable along the length of said upper surface of said first planar plate in a direction parallel to said first straight guide edge, and adapted to pivot from a position extending perpendicularly to, and beyond the edge of said first straight guide edge to a position spaced from said first straight guide edge to permit the passage of said power too.

2. The power tool guide of claim 1 wherein said pivolable bar is slidable along a rod fixed at either end to said upper surface of said first planar plate.

3. The power tool guide of claim 2 wherein said rod is releasably fixed at either end to said upper surface of said first planar plate.

4. The power tool guide of claim 1 wherein said clamping means comprise locking pliers comprising a fixed handle secured to said outer surface of said second planar plate, an adjustable jaw opposing said lower surface of said first planar plate and pivotable in relation to said fixed handle, a movable handle pivotally attached to said adjustable jaw, and lever-locking means between said movable handle and said fixed handle for establishing and maintaining a locking relation between said adjustable jaw and said lower surface of said workpiece when in a closed position.

5. The power tool guide of claim 1 wherein said planar upper surface of said first planar plate is marked with a plurality of parallel lines extending perpendicularly to said first guide edge.

6. The power tool guide of claim 1 wherein said pivotable bar is sufficiently long and wide to receive off-set markings for a plurality of different tools.

7. The power tool guide of claim 1 wherein said first planar plate further comprises a second guide edge extending perpendicularly to said first planar upper surface and parallel to said first straight guide edge.

8. The power tool guide of claim 1 wherein said second planar plate comprises two threaded apertures for receiving adjustment bolts.

9. The power tool guide of claim 1 wherein said pivotable bar comprises adjustable means for indicating an off-set marking thereon, said bar being movable along the length of said upper surface of said first planar plate in a direction parallel to said first straight guide edge, and adapted to pivot from a first position extending perpendicularly to, and beyond the edge of said first straight guide edge to a position oriented 180 degrees to said first position to permit the passage of said power tool.

10. The power tool guide of claim 1 wherein said pivotable bar comprises first and second sections in pivoting relationship, said second section surface being adapted for receiving an off-set marking thereon, said bar being movable along the length of said upper surface of said first planar plate in a direction parallel to said first straight guide edge, and said second section adapted to pivot from a first position extending perpendicularly to, and beyond the edge of said first straight guide edge to a second position oriented 180 degrees to said first position to permit the passage of said power tool.

11. A locking, clamping tool for releasably attaching to a workpiece comprising:
   i) a first planar plate for placement on a workpiece having an upper and lower surface, having a planar upper surface, a planar lower surface and a first straight guide edge perpendicular to said first planar upper surface;
   ii) a second planar plate extending perpendicularly to said first planar surface and to said straight guide edge, said second planar plate having a planar inner surface and an outer surface; and
   iii) locking pliers comprising a fixed handle secured to said outer surface of said second planar plate, an adjustable jaw opposing said lower surface of said first planar plate and pivotable in relation to said fixed handle, a movable handle pivotally attached to said adjustable jaw, and lever-locking means between said movable handle and said fixed handle for establishing and maintaining a locking relation between said adjustable jaw and said lower surface of said workpiece when in a closed position; and
   iv) a pivotable bar having a surface for receiving an off-set marking, movable along the length of said upper surface of said first planar plate in a direction parallel to said first straight guide edge, and adapted to pivot from a position extending perpendicularly to, and beyond the edge of said first straight guide edge to a position spaced from said first straight guide edge to permit the passage of said power tool.

12. A power tool guide adapted for releasably securing to a workpiece having upper and lower planar surfaces, said power tool guide comprising:
   i) a first planar plate having a planar upper surface, a planar lower surface and a first straight guide edge perpendicular to said first planar upper surface;
   ii) a second planar plate extending perpendicularly to said first planar plate and to said straight guide edge, said second planar plate having a planar inner surface and an outer surface; and
   iii) clamping means secured to said outer surface of said second planar plate, said clamping means having an adjustable lower clamping jaw adapted to bear against said lower surface of said workpiece and thereby releasably secure said guide to a workpiece; and
   iv) a pivotable bar having first and second sections in pivoting relationship, said second section surface being adapted for receiving an off-set marking thereon, said bar being movable along the length of said upper surface of said first planar plate in a direction parallel to said first straight guide edge, and said second section adapted to pivot from a first position extending perpendicularly to, and beyond the edge of said first straight guide edge to a second position oriented 180 degrees to said first position to permit the passage of said power tool.

* * * * *